June 8, 1954 — W. H. MADDEN — 2,680,557
FROZEN CONFECTION SANDWICH CONTAINER
Filed Feb. 9, 1950
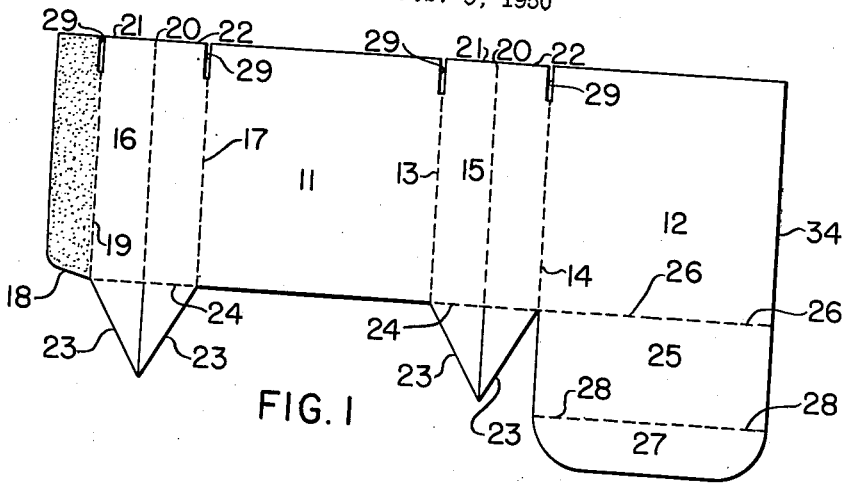
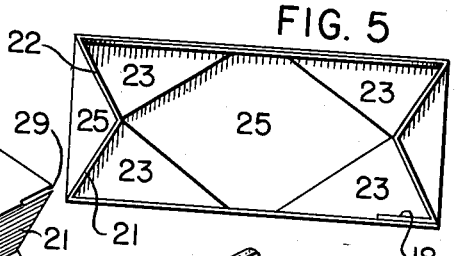
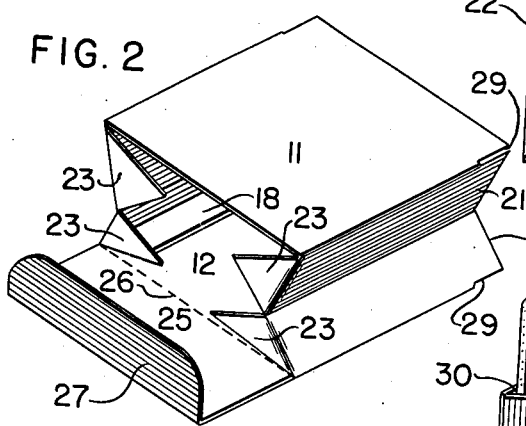
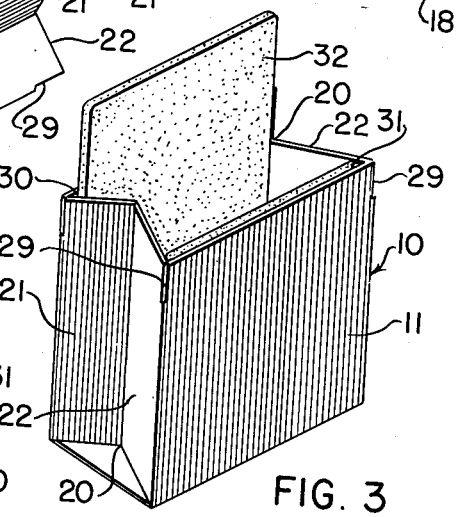
INVENTOR.
Wilson H. Madden
BY Clarence G. Campbell
ATTORNEY Patented June 8, 1954

2,680,557

UNITED STATES PATENT OFFICE 2,680,557

FROZEN CONFECTION SANDWICH CONTAINER

Wilson H. Madden, Huntington, N. Y.

Application February 9, 1950, Serial No. 143,192

2 Claims. (Cl. 229—38)

My invention relates to an improvement in a frozen confection sandwich container and its novelty consists in the arrangement and combination of parts as will be more fully hereinafter pointed out.

In making an ice cream or other frozen confection sandwich, the great problem is to provide an open top container adapted to readily receive and firmly hold two crackers or outer sandwich elements against breakage and in a separated manner to have them ready for filling with a soft frozen confection so that it can be readily and hygenically done and when hard frozen be easily opened for eating without soiling the hands of the person eating the sandwich.

My device solves this problem with a container that is easy to make rapidly in large quantities by machine at the minimum cost and which insures the easy and rapid loading and safe transport of the cracker or outer sandwich elements in separated positions ready for quick and easy filling in between with soft frozen confection and adapted for easy and non-soiling opening for eating after hard freezing.

Referring to the drawings—

Fig. 1 is a flat of my device;

Fig. 2 is a perspective of my assembled container on its side and with the bottom open;

Fig. 3 is a perspective of the container with sandwich crackers one of which is in the raised position;

Fig. 4 is a perspective of the container with complete filling; and

Fig. 5 is a top plan view of the interior of my container.

In the drawings, 10 is my complete unitary container which has two side elements 11 and 12 which are connected together at inside scorings 13 and 14 by end element 15 and a second end element 16 is connected to the side element 11 by an inside scoring at 17. An overlap element 18 is attached to the end element 16 at an inside scoring 19.

Each of said end elements 15 and 16 has an outside vertical scoring 20 down the middle forming by folding thereon an inturned accordion element at each end having faces 21 and 22. Each of the faces 21 and 22 of the end elements 15 and 16 has a locking tab 23 connected at horizontal scoring 24 to the bottom edge.

A bottom tab or bottom closure 25, narrower than end elements 15 and 16, is secured to such element 12 at horizontal inside scoring 26 and a second or tucking tab 27 is secured to bottom closure tab 25 at horizontal scoring 28. Cuts 29 are also made in the flat at the upper ends of scorings 13, 14, 17 and 19. This can all be readily done by one machine operation.

In forming container 10 from the flat as shown in Fig. 1, side element 12 is folded upwardly on scoring 14 and end element 15 is folded upwardly on side element 11 at scoring 13 and 11 is folded upwardly on scoring 17 and end element 16 is folded upwardly on scoring 19. Bottom closure tab 25 is folded upwardly on the scoring 26 and tucking tab 27 is folded upwardly on the scoring 28. Each pair of inside locking tabs 23 of end elements 15 and 16 will be turned up on horizontal scorings 24.

The faces 21 and 22 of end elements 15 and 16 are turned downwardly on the outside scorings 20 so as to form a compressible accordion element of each end element 15 and 16 and to also form pockets 30 and 31 between said faces 21 and 22 of each end element 15 and 16 and the side elements 11 and 12 into which crackers 32 can be readily slid and held in a separated position in pockets 30 and 31 so that a frozen confection or ice cream 33 can be readily fed in between crackers 32 in a soft frozen condition.

In forming my container 10 the overlap 18 will be brought around inside of edge 34 of side element 12 and glued and adhered thereto in the regular way and the bottom closure 25 will be brought up against the bottom of container 10 and the tucking tab 27 tucked into the opening along the lower edge of side element 11 so as to close the bottom of container 10 with both pair of locking tabs 23 of end elements 15 and 16 on the inside of the bottom element 25 so that one pair of locking tabs 23 always are under pressure against the tucking element 27 thereby securely locking the bottom closure 25 in place against accidental dislodgement. The position of these locking tabs 23 is shown in Fig. 5 and they will lock against the inside lower side walls of side elements 11 and 12 so as to permit the end accordion elements 15 and 16 to compress only to a limited extent as controlled by said locking elements locking against said side elements 11 and 12 as said accordion elements 15 and 16 are compressed by pressure on the side elements 11 and 12. This forming and sealing of the complete container 10 can also be readily done by machine operation.

One of the objects and principal advantages of my construction is that it forms perfect pockets 30 and 31 into which can be rapidly fed by machine, crackers 32 which are held in a separated protected position so that they can be shipped to dealers all ready so that soft frozen confection such as ice cream can be flowed into said space between said crackers 32 and then hard frozen thereby forming a perfect frozen confection sandwich.

My container 10 has cuts 29 at the upper junction corners of the side elements 11 and 12 with the end elements 15 and 16 and overlap element 18 so that with the hard frozen sandwich therein the person about to eat same can readily peel down the end elements 15 and 16 because of said cuts 29 which facilitate such easy tearing thereby providing a quick and easy way to remove container 10 from the hard frozen sandwich for eating without soiling the fingers of the person eating said hard frozen sandwich.

This novel structure is adapted for many uses other than as a frozen confection sandwich former and holder and such variations and adaptations are comprehended within the scope of the specification, drawings and claims herein.

What I claim is:

1. A single piece open top frozen confection paper board holder flat comprising a side member, a bottom closure member connected to the bottom edge of said side member by an inside horizontal scoring, a tuck member connected to the bottom edge of said bottom closure member by an inside horizontal scoring, an end member connected to one side of said side member by an inside vertical scoring, a vertical outside scoring along the entire middle of said end member, a second side member connected to said end member by an inside vertical scoring, a second end member connected to the opposite side of said second side member from the first end member by an inside vertical scoring and having an outside vertical scoring along the full length of the middle portion of same, and a pair of right angular locking and spacing flaps hingedly connected to the lower end of each end member, one leg of each triangular flap of each pair being connected to the lower end of the end member, the other legs of the right triangular flaps of each pair abutting each other in the axis of said vertical outside scorings of said end members, the combined width of each of said pairs of right triangular flaps along said hinged connection being equal to the width of an end member, the bottom closure member being less length, as measured from the side wall to the tuck member, than the width of an end member so that when set up for use a pair of pockets are formed adjacent the inner side of each side member to receive sandwich elements and said end members each forming gussetted members held against collapse by said pairs of locking and spacing flaps.

2. In a single piece open top frozen confection container, the combination of a first side wall having a bottom closure member attached to the lower edge, a tuck member connected to the lower edge of said bottom closure member, an end wall connected to one side of said side wall having an outside vertical median scoring along its entire length, a second side wall connected to the opposite side edge of said end wall from the first side wall, a second end wall connected to the opposite side edge of said second side wall from said first end wall and having an outside vertical median scoring along its entire length, an overlap fastening member connected to the outer side of said second end wall from the second side wall, the bottom closure member being of less length, as measured from the side wall to the tuck member, than the width of an end wall, the side walls being disposed in parallel relation and the overlap fastening member being secured to the first side wall, the end walls being disposed inwardly of the side walls forming gussetted end walls, the bottom closure member being disposed perpendicularly to said first side wall with the tuck member disposed against the inner surface of the second side wall, each panel of said gussetted end walls having a flap hingedly connected at its edge, said flaps lying against said bottom closure member, one side edge of each flap bearing against the inner surface of the adjacent side wall or against the inner surface of said tuck member as the case may be.

References Cited in the file of this patent

UNITED STATES PATENTS

| Number | Name | Date |
|---|---|---|
| 933,454 | Hudson | Sept. 7, 1909 |
| 1,281,255 | Vogel | Oct. 8, 1918 |
| 1,466,962 | Reynolds | Sept. 4, 1923 |
| 1,516,090 | Gary | Nov. 18, 1924 |
| 1,669,237 | Gingras | May 8, 1928 |
| 1,679,121 | Freedman | July 31, 1928 |
| 1,743,681 | Neuman | Jan. 14, 1930 |
| 1,755,699 | Loehr | Apr. 22, 1930 |
| 2,218,509 | Goodyear | Oct. 22, 1940 |
| 2,314,631 | Ray | Mar. 23, 1943 |
| 2,379,665 | Stone | July 3, 1945 |
| 2,390,412 | Axberg | Dec. 4, 1945 |
| 2,521,403 | Overland | Sept. 5, 1950 |